United States Patent
Kikuchi et al.

(10) Patent No.: US 6,790,930 B1
(45) Date of Patent: Sep. 14, 2004

(54) PROCESS FOR PRODUCING POLYIMIDE RESIN

(75) Inventors: Takeshi Kikuchi, Shiga (JP); Hiroyuki Tsuji, Shiga (JP); Koji Okada, Shiga (JP); Hiroyuki Furutani, Osaka (JP); Koichiro Tanaka, Shiga (JP); Shoji Hara, Shiga (JP); Hitoshi Nojiri, Shiga (JP)

(73) Assignee: Kaneka Corporation, Osaka (JP)

( * ) Notice: Subject to any disclaimer, the term of this patent is extended or adjusted under 35 U.S.C. 154(b) by 118 days.

(21) Appl. No.: 10/110,122

(22) PCT Filed: Oct. 6, 2000

(86) PCT No.: PCT/JP00/07013

§ 371 (c)(1),
(2), (4) Date: Apr. 4, 2002

(87) PCT Pub. No.: WO01/25313

PCT Pub. Date: Apr. 12, 2001

(30) Foreign Application Priority Data

Oct. 6, 1999 (JP) .......................................... 11/286131
Nov. 12, 1999 (JP) .......................................... 11/323326
Jul. 24, 2000 (JP) ........................................ 2000-222815

(51) Int. Cl.⁷ ........................ C08G 73/10; C08G 69/26
(52) U.S. Cl. .................... 528/353; 528/125; 528/126; 528/128; 528/170; 528/171; 528/172; 528/173; 528/174; 528/176; 528/185; 528/188; 528/220; 528/228; 528/350
(58) Field of Search ................................ 528/353, 170, 528/125–128, 171–174, 176, 220, 228, 350, 351; 525/420

(56) References Cited

U.S. PATENT DOCUMENTS

| | | | | | |
|---|---|---|---|---|---|
| 4,914,182 A | * | 4/1990 | Pfeifer et al. | ................ | 528/353 |
| 5,066,760 A | * | 11/1991 | Seidl et al. | ................... | 528/51 |
| 5,321,096 A | * | 6/1994 | Okawa et al. | .............. | 525/420 |
| 5,563,237 A | * | 10/1996 | Endo et al. | ................. | 528/322 |
| 5,614,607 A | * | 3/1997 | Hay et al. | .................... | 528/353 |
| 5,734,008 A | * | 3/1998 | Shirasaki et al. | ........... | 528/353 |
| 6,046,303 A | * | 4/2000 | Choi et al. | ................. | 528/353 |
| 6,048,959 A | * | 4/2000 | Bryant | ...................... | 528/353 |
| 6,350,845 B1 | * | 2/2002 | Okada et al. | .............. | 528/170 |
| 6,500,924 B1 | * | 12/2002 | Brooks et al. | ............. | 530/350 |

FOREIGN PATENT DOCUMENTS

| | | |
|---|---|---|
| JP | 51-12676 | 4/1976 |
| JP | 61-225216 | 10/1986 |
| JP | 3-59030 | 3/1991 |
| JP | 5-214101 | 8/1993 |
| JP | 7-242745 | 9/1995 |
| JP | 8-225741 | 9/1996 |

OTHER PUBLICATIONS

International Search Report Corresponding to International Application No. PCT/JP00/07013 From Japanese Patent Office Dated Jan. 16, 2001, 1 Page.

* cited by examiner

*Primary Examiner*—P. Hampton Hightower
(74) *Attorney, Agent, or Firm*—Brinks Hofer Gilson & Lione

(57) ABSTRACT

The present invention provides a method for easily producing a high-molecular weight polyimide resin at high yield by drying and heating a mixture mixed by material monomers of polyimide.

21 Claims, No Drawings

PROCESS FOR PRODUCING POLYIMIDE RESIN

RELATED APPLICATIONS

This application is a nationalization of PCT application PCT/JP00/07013 filed Oct. 6, 2000. This application claims priority from the PCT application and Japan Application Serial No. 11/286131 filed Oct. 6, 1999; Japan Application Serial No. 11/323326 filed Nov. 12, 1999; Japan Application Serial No. 2000/222815 filed Jul. 24, 2000.

TECHNICAL FED

The present invention relates to a method for producing polyimide resins. More particularly, the invention relates to a method for producing polyimide resins for forming polyimides by mixing material polymers for polyimides and drying this by heating under reduced pressure.

BACKGROUND ART

Among a variety of organic polymers, polyimides have been widely used in various fields ranging from the aerospace field to the electronic communications field because of their superior heat resistance.

Generally, a polyimide is obtained by reacting diamine with acid dianhydride in organic solvent to afford a polyamic acid, which is cyclopolymerized for imidization.

In the reaction of imidization of a polyamic acid, water is produced. Generally, to imidize while removing water, a method for azeotropic removal of produced water is used. For instance, JP 63-297427 discloses a method for forming polyimides by forming amide acid in an organic solvent such as N-methyl pyrrolidone, heating after adding an azeotropic solvent such as toluene or xylene to remove water azeotropically out of the reaction system. With the use of this method, however, it is impossible to keep a polyamic acid away from its hydrolysis by the produced water which exists in a solution. This makes it difficult to obtain high-molecular weight polyimides.

In another method, there is a method for chemically removing the produced water. More particularly, there is a method for adding a basic catalyst included in tertiary amines such as triethyl amine, pyridine, picoline (e.g. β-picoline), and isoquinoline, or a combination of a basic catalyst and an anhydride such as acetic anhydride. Water produced in the imidization is chemically removed by the reaction with acid anhydride. This method, however, requires a process for purification of a reaction mixture to remove the residue such as tertiary amines and acetic anhydrides out of the system.

When highly basic diamines, for instance, alicyclic diamines with basicity higher than aromatic diamines are used as a diamine monomer, a salt is produced by the neutralization reaction before forming a polyamic acid at the point that the alicyclic diamines are mixed with acid dianhydrides and precipitated. Since this salt is in a stable state, it is neither possible to form a polyamic acid by polymerization reaction nor to imidize polyamic acid by the reaction with a hydrating reagent. It was, therefore, difficult to obtain polyimides using alicyclic diamines.

A method for reacting acid dianhydrides and diisocyanates is used as a method to obtain polyimides without a step of producing an intermediate. This method usually requires heating at least 250° C. under ordinary pressure to complete imidization because of low reactivity of acid dianhydride and diisocyanate, eared with the case of using diamine and acid dianhydride. Consequently, the kinds of the usable organic solvents at the time of reaction are limited. There were problems that required synthesis of polyimides was not realized depending on the structure of diisocyanate and/or acid dianhydride which is a starting material because of poor solubility in a high-boiling organic solvent.

In order to solve the above-mentioned problems, the present invention provides a method for easily producing high-molecular weight polyimides at high yield.

DISCLOSURE OF THE INVENTION

A method for producing a polyimide resin according to the present invention comprises the processes for: (a) mixing material monomers for polyimides; and (b) drying the mixture by heating under reduced pressure after the process (a).

Another method for producing a polyimide resin according to the present invention comprises the processes for: (c) producing a polyamic acid by mixing an acid dianhydride and a diamine in an organic solvent and reacting between them, wherein the material monomers are an acid dianhydride and a diamine; and (d) drying the polyamic acid by heating under reduced pressure after the process (c).

In still another method for producing a polyimide resin according to the present invention, the process (d) may be a process for drying the polyamic acid by heating under reduced pressure until its imidization reaction is completed in the absence of an azeotropic solvent and/or a hydration condensing reagent.

A further method for producing a polyimide resin is to produce a salt in the process (a).

In a still further method for producing a polyimide resin, material monomers for polyimides may be an acid dianhydride and A diisocyanate in the process (a).

The may contain an organic solvent.

In the drying process, the ambient temperature may be adjusted within the range of 80° C. to 400° C., and/or the pressure may be adjusted within the range of $0.001 \times 10^5$ to $0.9 \times 10^5$ Pa and the pressure may be adjusted within the range of $0.001 \times 10^5$ to $0.6 \times 10^5$ Pa.

The drying process may include drying the polyamic acid by heating under reduced pressure until its imidization reaction is completed in the absence of the azeotropic solvent and/or the hydration condensing reagent.

The polyimide resin preferably has a glass transition temperature of 350° C. or lower and/or a weight-average molecular weight of 5,000 to 1,000,000.

The molecular weight of the polyimide formed in the process (d) is substantially identical with the theoretical molecular weight of the polyimide obtained from the weight-average molecular weight of the polyamic acid, or the molecular weight of the polyimide increases before the drying process.

The polyimide resin may be soluble in the organic solvent.

The acid dianhydride according to the present invention may include one kind or a combination of at least two kinds of combination selected from the acid dianhydride represented by the following formulae (1) to (3) in a proportion of not smaller than 10 mole % (wherein X is a divalent organic group, and Y and Z are each a single bond or a divalent organic group):

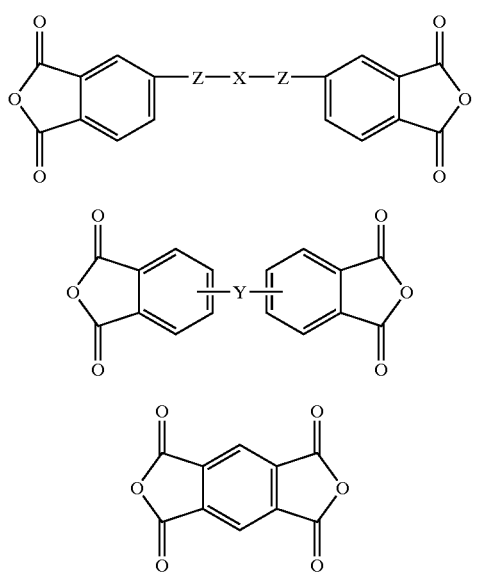

In the formula (1), X represents —C(CH$_3$)$_2$—, —C(CF$_3$)$_2$—, —CH$_2$C(CH$_3$)$_2$CH$_2$—, —(CH$_2$)$_q$— (q is an integer from 1 to 10) and may be a divalent organic group selected from the following I group (wherein T is any one of Cl, F, Br, CH$_3$—, CH$_3$O—):

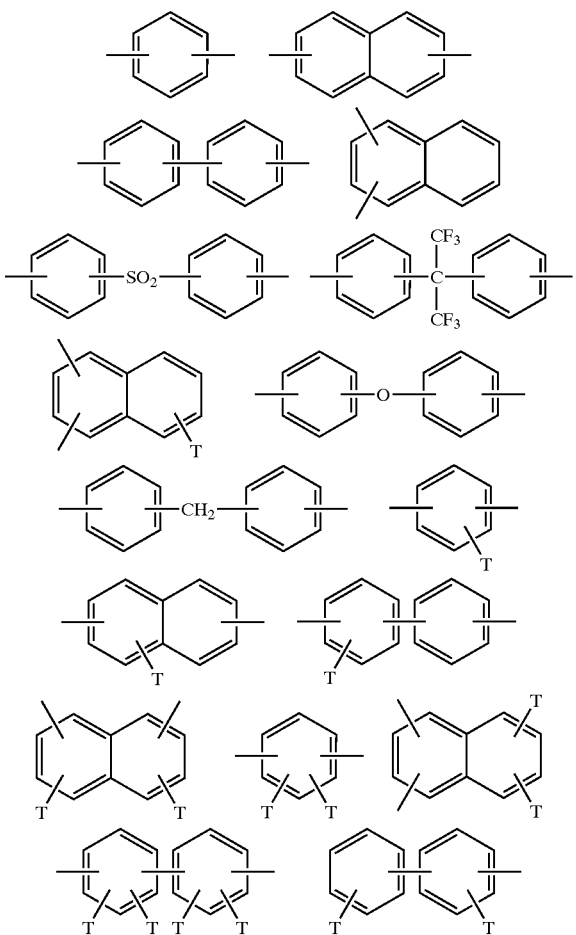

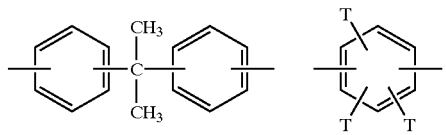
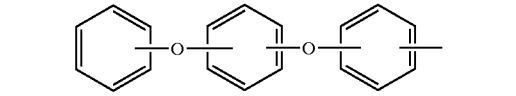
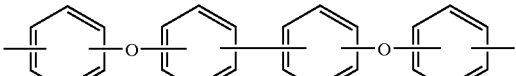
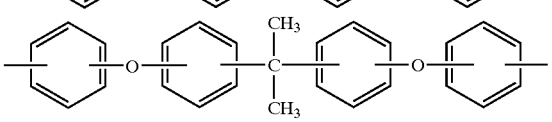
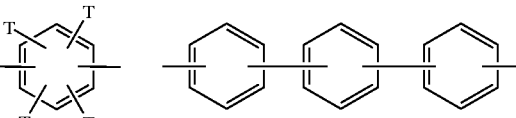
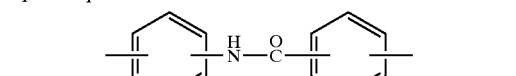
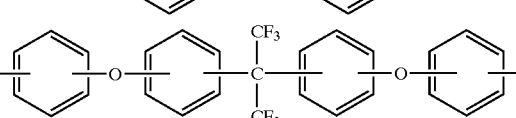
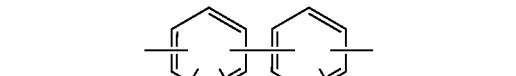
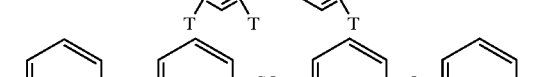
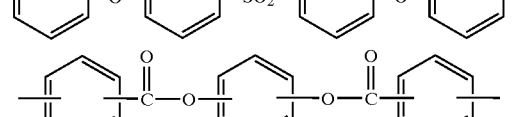
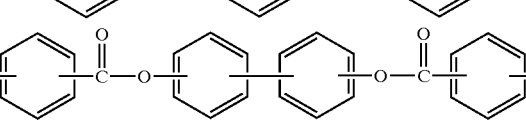

(I Group)

In the formula (1), Z may be a divalent organic group selected from a single bond, —O—, —C(=O)—, —C(O)O—, and —SO$_2$—.

In the formula (2), Y may be a divalent organic group selected from the group consisting of a single bond, —O—, —C(=O)—, or —SO$_2$—.

The diamine according to the present invention may be an aliphatic diamine and/or an alicyclic diamine.

In addition, the diamine may contain at least one kind of diamine represented by the following formulae (4) and (5) in a proportion of not smaller than 10 mole % based on the total amount of diamine monomer:

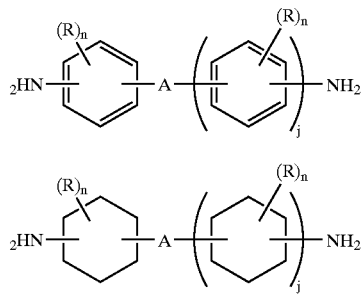

(4)

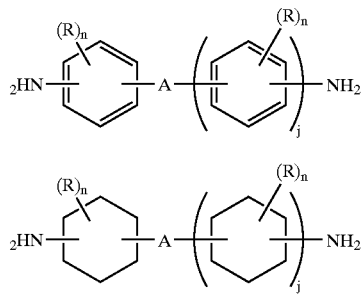

(5)

(wherein R is independently selected from the group consisting of Cl, F, Br, a hydroxy group, a carboxy group, an alkyl group having 1 to 4 carbons, or an alkoxyl group, and A is an independent divalent organic group selected from a single bond, —C(CH$_3$)$_2$—, —(CH$_2$)$_p$— (p is an integer not smaller than 1), —C(CF$_3$)$_2$—, —O—, —S—, SO$_2$—, —C(=O)—, —C(=O)O—, or —NHCO—, n=0, 1, and 2. j is an integer not smaller than 0.)

The diamine of the present invention may contain a combination of one kind or a combination of at least two kinds of diamines selected from the following formulae in a proportion of not smaller than 10 mole % based on the total amount of diamine monomers:

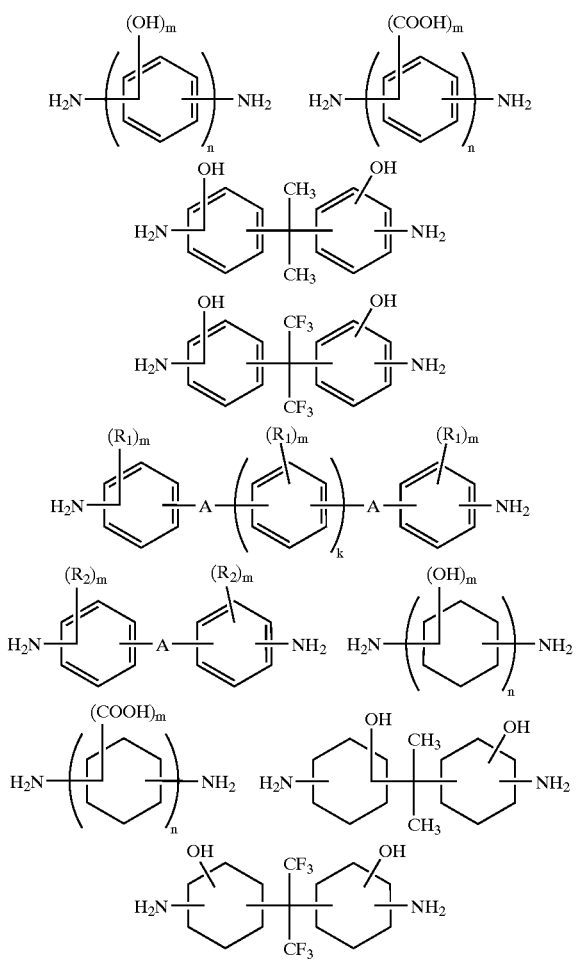

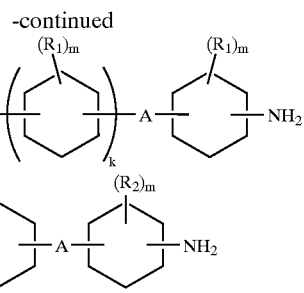

(wherein R$_1$ is Cl, F, Br or CH$_3$— or CH$_3$O—, R$_2$ is hydrogen, an alkyl group having 1 to 4 carbons or an alkoxy group having 1 to 4 carbons, and A is a divalent organic group selected from a single bond, —C(CH$_3$)$_2$—, —S—, —O—, —SO—, —SO$_2$—, —C(=O)—, —C(=O)O—, and —(CH$_2$)p— (p is an integer from 1 to 10), —C(CF$_3$)$_2$—, —C(=O)O—, —NHCO—. m=0, 1, and 2. n=1, 2. k is an integer of not smaller than 0).

The acid dianhydride may contain an ester acid dianhydride of the following formula (6) in a proportion of not smaller than 50 mole % based on the total amount of acid dianhydride monomer:

(6)

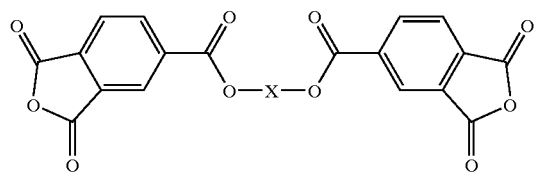

(wherein X represents a divalent organic group.)

Further X in the formula (6) may be selected from the following group consisting of

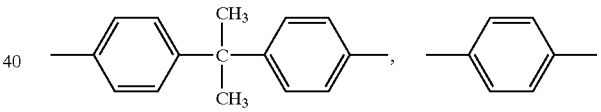

and —CH$_2$— or (CH$_2$)$_q$— (q is an integer of not smaller than 1).

The diisocyanate of the present invention may contain at least one kind of diisocyanate in a proportion of not smaller than 50 mole % represented by the following formula (7):

(7)

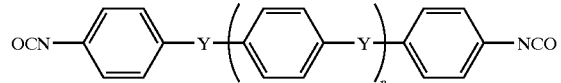

(wherein Y is a divalent organic group and n is an integer from 1 to 10).

In the formula (7), Y may be a divalent organic group selected from the group consisting of a single bond, —C(CH$_3$)$_2$—, —(CH$_2$)m— (m is an integer of not smaller than 1), —C(CF$_3$)$_2$—, —S—, —O—, —C(=O)—, —SO$_2$—, —C(=O)O—, or —NHCO—.

BEST MODE FOR CARRYING OUT THE INVENTION

Next, a preferred embodiment of a method for producing polyimide resins according to the present invention will be described in detail.

A method for producing polyimide resins according to the present invention is basically characterized in that desired polyimides can be formed by mixing material monomers for polyimides to be used such as acid dianhydride and diamine, or acid dianhydride and diisocyanate, and then heating the mixture under reduced pressure without any additional processes.

The present invention will now be described in detail.

First, an explanation will be given to a preferred embodiment of the present invention in the case that material monomers for polyimides to be used are acid dianhydride and diamine. With the use of this method, polyimide resins are formed by a process for mixing acid dianhydride and diamine, and a process for drying the mixture by heating under reduced pressure.

A polyamic acid is formed by the reaction between acid dianhydride and diamine. The reaction generally occurs in organic solvents.

The acid dianhydride to be used as a material monomer in the present invention is not particularly limited, but, for instance, any acid dianhydrides such as aromatic tetracarboxylic dianhydriedes or aliphatic or alicyclic tetracarboxylic dianhydrides may be used. In the present invention, "aromatic tetracarboxylic dianhydrides" mean substances having at least one aromatic group in molecular, "aliphatic tetracarboxylic dianhydrides" mean substances without alicyclic group or aromatic group in molecular, and "alicyclic tetracarboxylic dianhydrides" mean substances having at least one alicyclic group in molecular, but excluding an aromatic group in molecular.

The aromatic tetracarboxylic dianhydride to be used in the present invention is not particularly limited, but examples thereof include: pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, bis(phthalic acid) phenylphosphine oxide dianhydride, p-phenylene-bis (triphenylphthalic acid)dianhydride, m-phenylene-bis (triphenylphthalic acid)dianhydride, bis(triphenylphthalic acid)-4,4'-diphenyl ether dianhydride, bis(triphenylphthalic acid) -4,4'-diphenylmethane dianhydride.

Alternatively, examples of the aromatic tetracarboxylic dianhydride include: aliphatic tetracarboxylic anhydrides containing an aromatic ring such as 1,3,3a,4,5,9b-hexahydro-2,5-dioxo-3-furanyl)-naphtho[1,2-c]furan-1,3-dione, 1,3,3a,4,5,9b-hexahxydro-5-methyl-5-(tetrahydro-2, 5-dioxo-3-furanyl)-naphtho[1,2-c]furan-1,3-dione, 1,3,3a,4, 5,9b-hexahydro-8-methyl-5-(tetrahydro-2,5-dioxo-3-furanyl)-naphtho[1,2-c]furan-1,3-dione, compounds represented by the following general formula (1):

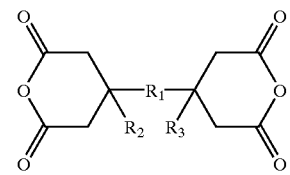

(wherein $R_1$ represents a divalent organic group having an aromatic ring, and $R_2$ and $R_3$ each represent a hydrogen atom or an alkyl group), and compounds represented by the following general formula (2):

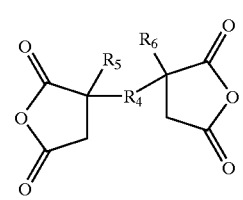

(wherein $R_4$ represents a divalent organic group having an aromatic ring, and $R_5$ and $R_6$ each represent a hydrogen atom or an alkyl group).

Examples of the aliphatic or alicyclic tetracarboxylic dianhydride to be used in the present invention include: butanetetracarboxylic dianhydride, 1,2,3,4-cyclobutanetetracarboxylic dianhydride, 1,3-dimethyl-1,2,3, 4-cyclobutanetetracarboxylic acid, 1,2,3,4-cyclobutanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofural)-3-methyl-3-cyclohexene-1,2-dicarboxylic dianhydride and bicyclo[2,2,2]-oct-7-ene-2,3, 5,6-tetracarboxylic dianhydride.

These tetracarboxylic dianhydrides may be used either alone or in combination of two or more.

A preferred embodiment of acid dianhydride to be used in the present invention is at least one aromatic tetracarboxylic dianhydride selected from compounds represented by the following formula (1), (2) and (3):

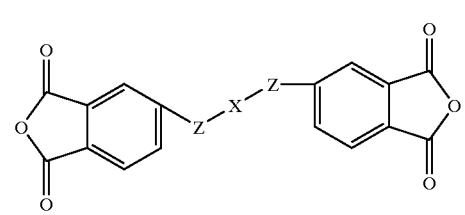

(wherein X represents a divalent organic group and Z represents a single bond or a divalent organic group).

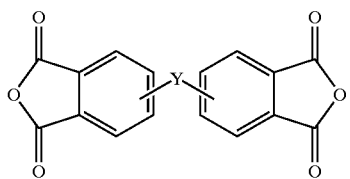

(2)

(wherein Y represents a single bond or a divalent organic group).

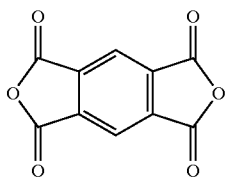

(3)

In the formula (1), a divalent organic group represented by X generally has 1 to 24 carbons and comprises an aliphatic group, an alicyclic group, an aromatic group, and a combination of these groups. Divalent groups represented by Z in the formula (1) and Y in the formula (2) are each an organic group having at least one hetero atom in its main chain. Examples of hetero atoms include oxygen, sulfur, nitrogen, silicon, and phosphorus, but not limited to them.

In preferred compounds represented by the above-mentioned formula (1), X is a divalent organic group consisting of —C(CH$_3$)$_2$—, —C(CF$_3$)$_2$—, —CH$_2$C(CH$_3$)$_2$CH$_2$—, or (CH$_2$)$_q$— (q is an integer from 1 to 10) and the following formula:

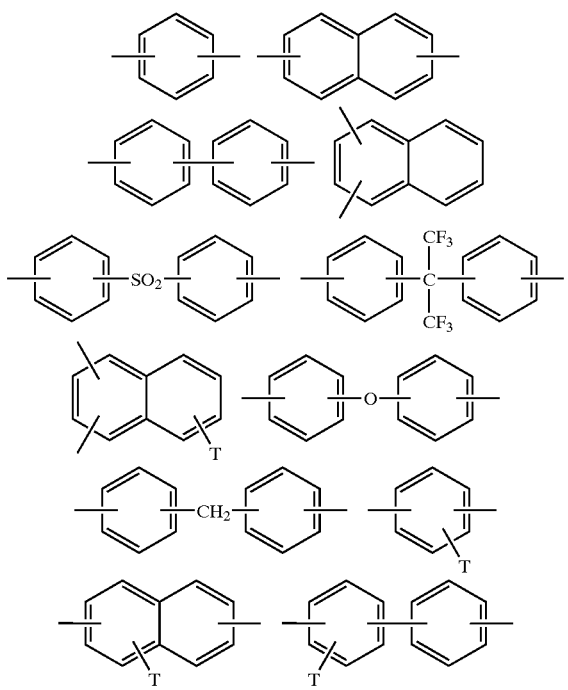

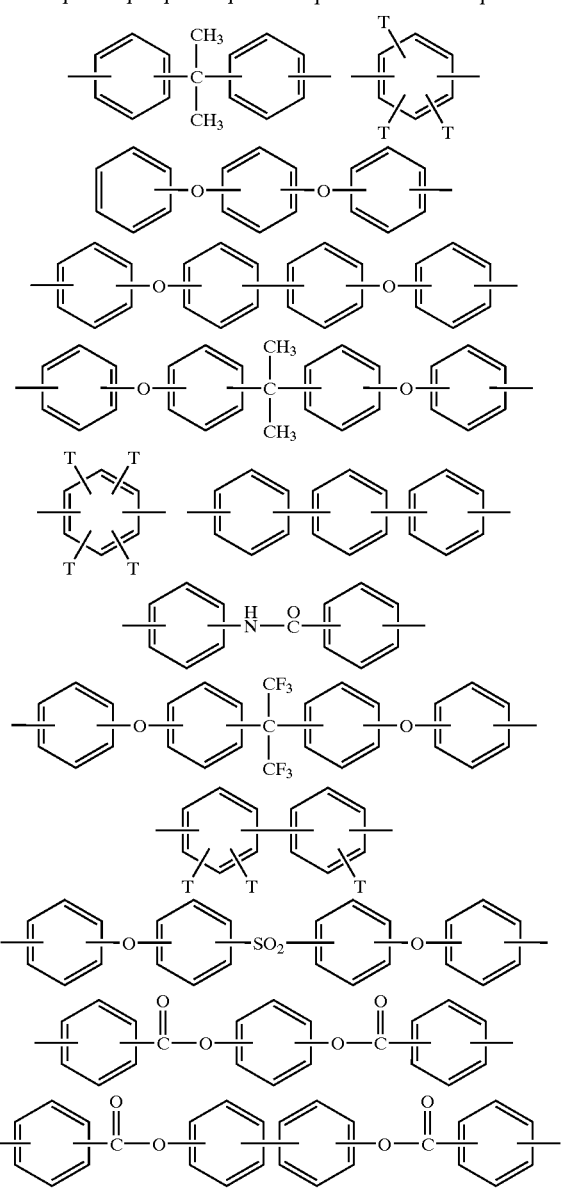

(wherein T is any one of Cl, F, Br, CH$_3$—, and CH$_3$O—).

In preferred compounds represented by the above-mentioned formula (1), Z may be a divalent organic group selected from a single bond, —O—, —C(=O)—, —C(=O)O—, and —SO$_2$—. Further, in another preferred compounds, X and Z may be selected from the range of the above-mentioned specific examples. In another preferred compounds represented by the above-mentioned formula (2), Y may be a divalent organic group selected from a single bond, —O—, —C(=O)—, —C(=O)O—, and —SO$_2$—.

With the use of aromatic tetracarboxylic dianhydrides represented by the above-mentioned formulae (1) to (3), thermoplastic polyimide resins which combine superior heat resistance (heat decomposability) and workability may be formed. At least one kind of acid dianhydride selected from the groups consisting of the compounds represented by the above-mentioned formulae (1) to (3) may be used in a proportion of not smaller than 10 mole %, preferably not smaller than 30 mole %, and further preferably not smaller than 50 mole % based on the total amount of acid dianhydride to be used.

Various kinds of diamines can be used for the diamines to be used as a material monomer in the present invention. Any diamines such as aromatic diamines and aliphatic diamines or alicyclic diamines may be used in the present invention.

Aromatic diamines are not particularly limited, but examples thereof include: p-phenylenediamine, m-phenylenediamine, 4,4'-diaminodiphenylmethane, 4,4'-diaminodiphenylethane 4,4'-diaminodiphenyl ether, 4,4'-diaminodihenyl sulfide, 4,4'-diaminodiphenyl sulfone, 1,5-diaminonaphthalene, 3,3'-dimethyl-4,4'-diaminobiphenyl, 5-amino-1-(4'-aminophenyl)-1,3,3-trimethylindan, 6-amino-1-(4'-aminophenyl)-1,3,3-trimethylindan, 4,4'-diaminobenzanilide, 3,5-diamino-3'-trifluoromethylbenzanilide, 3,5-diamino-4'-trifluoromethylbenzanilide, 3,4-diaminodiphenyl ether, 2,7-diaminofluorene, 2,2'-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis (trifluoromethyl)biphenyl, 2,2'-bis[4-(4-aminophenoxy) phenyl]propane, 2,2'-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]-hexafluoropropane, 4,4'-bis[4-(4-amino-2-trifluoromethyl)phenoxy]-octafluorobiphenyl. The examples may also include aromatic diamines such as diaminotetraphenylthiophene having two amino groups bonded to an aromatic ring and a hetero atom other than nitrogen atoms of the amino groups. Monosubstituted phenylene diamines such as 1,1'-metaxylene diamine and compound represented by the following formula may be used:

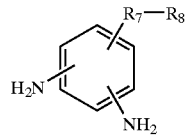

(wherein $R_7$ represents a divalent organic group selected from —O—, —C(=O)O—, —OOO—, —CONH—, and —C(=O)— and $R_8$ represents a monovalent organic group having steroid nucleus.)

Aliphatic or alicyclic diamines are not particularly limited, but examples thereof include: 1,3-propane diamine, tetramethylenediamine, pentamethylenediamine, octamethylenediamine, nonamethylenediamine, 4,4-diaminoheptamethylenediamine, 1,4-diaminocyclohexane, isophorone diamine, tetrahydrodicyclopentadienylene diamine, hexahydro-4,7-methanoindanilenedimethylene diamine, tricyclo[6,2,1,0$^{2.7}$]undecylenedimethyl diamine, 4,4'-methylenebis(cyclohexylamine). In addition, the examples of aliphatic diamines or alicyclic diamines include diamines having a siloxane chain represented by the following formula:

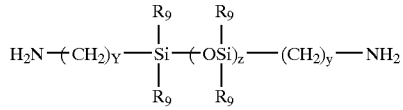

(wherein $R^9$ represents a hydrocarbon group having 1 to 12 carbons, y is independently an integer from 1 to 3, and z is an integer from 1 to 20.)

The above-mentioned diamine compounds may be used either alone or in combination of two or more.

The diamine to be preferably used in the present invention includes aromatic diamines or aliphatic diamines represented by the following formula (4) or (5):

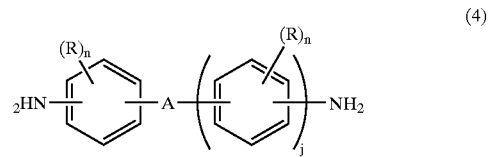

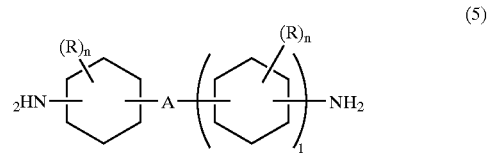

R is independently selected from Cl, F, Br, a hydroxy group, a carboxy group, an alkyl group having 1 to 4 carbons, and an alkoxy group having 1 to 4 carbons, A is independently a single bond, —C(CH$_3$)$_2$—, —(CH$_2$)$_p$— (p is an integer of not smaller than 1, preferably an integer from 1 to 6), —C(CF$_3$)$_2$—, —O—, —S—, —SO$_2$—, —C(=O)—, —C(=O)O—, or —NHCO—, n is 0 and 1, or 2, j is an integer of not smaller than 0, preferably an integer from 0 to 6.

The diamines represented by the formulae (4) and (5) are preferably represented by the following formulae:

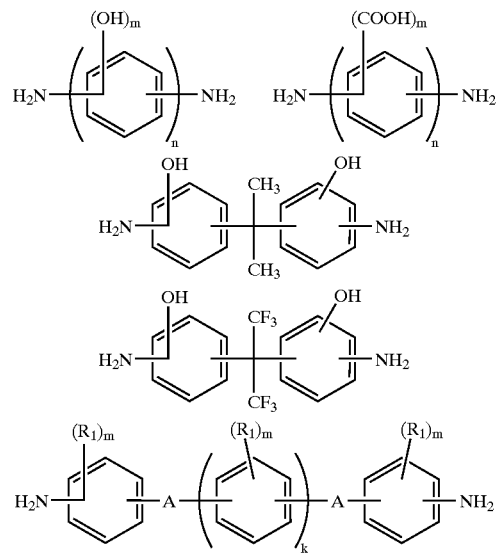

-continued

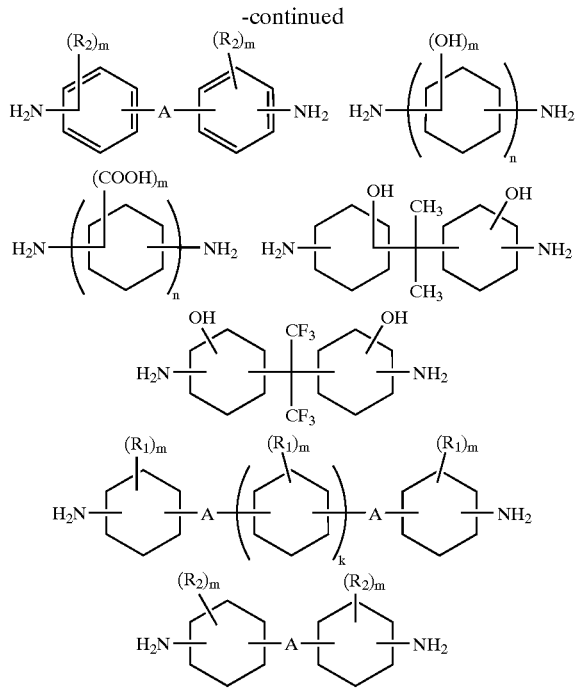

In the above-mentioned formulae, $R_1$ is hydrogen, Cl, F, Br, $CH_3$—, or $CH_3O$—, $R_2$ is hydrogen, an alkyl group having 1 to 4 carbons or an alkoxy group having 1 to 4 carbons, A is a single bond, —$C(CH_3)_2$—, —$(CH_2)_p$— (p is an integer from 1 to 10), —$C(CF_3)_2$—, —O—, —S—, $SO_2$—, —C(=O)—, —C(=O)O—, or —NHCO—. m is 0, 1 or 2, n is 1 or 2, k is an integer of not smaller than 0, preferably an integer from 1 to 4.

With the use of aromatic diamine or aliphatic diamine represented by the above-mentioned formula (4) or (5), thermoplastic polyimide resins which combine superior heat resistance (heat decomposability) and workability may be formed. At least one kind of diamine selected from the group consisting of the compounds represented by the above-mentioned formula (4) or (5) may be used in a proportion of not smaller than 10 mole %, preferably not smaller than 30 mole %, and further preferably not smaller than 50 mole % based on the total amount of diamine to be used.

The typical organic solvents which may be used in the above-mentioned mixing process are organic polar solvents. The organic polar solvents to be used in the present invention are not particularly limited, but examples thereof include: sulfoxide solvents such as dimethyl sulfoxide and diethyl sulfoxide, formamide solvents such as N,N-dimethylformamide and N,N-diethylformamide, acetamide solvents such as N,N-dimethylacetamide and N,N-diethylacetamide, pyrrolidone solvents such as N-methyl-2-pyrrolidone and N-vinyl-2-pyrrolidone, phenol solvents such as phenol, o-cresol, m-cresol or p-cresol, xylenol, halogenated phenols and catechol, ether solvents such as tetrahydrofuran and dioxane, alcohol solvents such as methanol, ethanol, and butanol, cellosolvic solvents such as butyl cellosolve, hexamethylphosphoramide, and γ-butyrolactone. These are preferably used either alone or in combination. Sane aromatic hydrocarbons such as xylene and toluene may be used.

The selection of the above-mentioned mixture of acid dianhydride and diamine with possible low-boiling is advantageous in processes to synthesize polyimides by subsequently heating under reduced pressure.

An explanation will now be given to a process for generating a polyamic acid by the reaction between diamine and acid dianhydride in the present invention.

A polyamic acid may be obtained by reacting any one of the above-mentioned diamine with acid dianhydride in organic solvent. The reaction occurs, for instance, by dissolving the diamine in organic solvent or diffusing the diamine in a slurry state in the inert atmosphere such as argon and nitrogen to add acid dianhydride in a state of dissolution in the organic solvent or in a state of slurry diffusion or adding diamine component to acid dianhydride by the reversion of the order of the above addition.

In this case, any polyamic acid polymer can be obtained by adjusting the molar ratio between diamine component and acid dianhydride component.

One kind of component of a diamine component and/or acid dianhydride component, or any mixture of two or more kinds may be used in the method for the present invention. These kinds of components may be added in organic solvent in arbitrary order.

For instance, a first diamine component and a second diamine component may previously be added in an organic polar solvent and then acid dianhydride may be added to afford a polyamic acid polymer solution. Alternatively, the first diamine component may previously be added in an organic polar solvent and acid dianhydride may be added and then the second diamine component to afford a polyamic acid polymer solution.

The first diamine component may previously be added in an organic polar solvent and the first acid dianhydride and then the second acid dianhydride may be added to afford a polyamic acid polymer solution.

Alternatively, the first and second diamines may previously be added in an organic polar solvent and the first acid dianhydride may be added and then the second acid dianhydride may be added to afford a polyamic acid polymer solution.

It is substantially the same as the above-described order, even if the order of addition is reversed, i.e. acid dianhydrides are previously added and then the diamine component is added.

The reaction temperature of polyamic acid generation reaction in the mixing process of acid dianhydride and diamine is preferably from −20° C. to 90° C. The reaction time is not particularly limited, but it is from 30 minutes to 24 hours.

The polyamic acid to be formed preferably has an average molecular weight (weight-average molecular weight) of 5,000 to 1,000,000. If the weight-average molecular weight is smaller than 5,000, the resulting polyimide composition will have a smaller molecular weight. Therefore, the polyimide composition, if used as it is, is not practical because of its brittleness. Conversely, if the molecular weight is greater than 1,000,000, a varnish of the polyamic acid will have an excessively high viscosity, so that the handling thereof is difficult.

Next, a process for imidizing a polyamic acid will be described in detail. As mentioned above, water is produced when polyamic acid is imidized. In a process for drying by heating under reduced pressure according to the present invention, water can actively be removed out of the system. Under the conditions of imidization in the present invention, the formation of an imide bond is developed after undergoing of the reformation of an amide bond because of the formation of an acid anhydride structure by heating under reduced pressure, even if the amide bond of polyamic acid is broken by produced water. Accordingly, a product of high molecular weight is deemed to be obtained (Please refer to the following Example 4).

The inclusion of tetracarboxylic acid with its rings opened by hydrolysis or acid anhydride with its one ring opened in acid dianhydride used as a material causes a stop of polymerization reaction of the polyamic acid. In the present invention, however, heating under reduced pressure at the time of imidization re-closes these opened ring sitesto provide an acid dianhydride structure, which may react with amine remaining in the system during imidization. The molecular weight of the polyimide to be obtained is therefore, expected to be improved.

The polyimide to be obtained by a method according to the present invention is characterized in that the polyimide is substantially the same or is increased in theoretical molecular weight of a polyimide calculated from the weight-average molecular weight of the polyamic acid before the drying process.

The term "substantially the same or is increased" herein used means that the molecular weight of polyimide is typically 90% at the minimum and is preferably not smaller than 95%, more preferably not smaller than 97%.

The extent of an increase in molecular weight is not particularly limited, but it is possible to increase the molecular weight up to ten times as many as the molecular weight of the polyamic acid or twenty times or forty times.

An imidization reacting process of the present invention is carried out in the absence of azeotropic solvent and/or dehydration condensing reagent.

In the case of a conventional method for removing water by heating the system together with azeotropic solvent as mentioned above, there was a problem that the molecular weight of imide to be obtained is reduced due to hydrolysis caused by the presence of water in the system. In a conventional method for conducting the imidization process to chemically remove water to be produced in the presence of a dehydrating condensation agent, there was a problem that a process for removing a reaction product of the dehydrating condensation agent and water remaining in the system was required. With the use of a method for the present invention, however, it is possible to avoid such a problem because the imidization reaction process can be done in the absence of azeotropic solvent and dehydrating condensation agent.

The term "in the absence of azeotropic solvent" herein means that there is no possibility of substantial azeotroping of a single solvent or solvent mixture presented at the imidization reaction time with water. In the present invention, this reflects no need of an operation to remove the water produced by imidization out of the system by azeotropy with water. Accordingly, this does not prevent solvent assumed to azeotrope with water from being dotted in a state or in an amount that no azeotropy with water may substantially occur in an imidization reaction mixture.

The term "dehydrating condensation agent" herein used is any reagent to be added to promote removing water produced by dehydrating condensation polymerization in imidization reaction. Typically, it is generically called any catalyst which may promote imidization reaction and any compound which may chemically react with water. Examples of dehydrating condensation agent include a basic catalyst such as tertiary amines; triethylamine, pyridine, picoline (e.g. β-picoline), and isoquinoline, and a combination of such basic catalyst and aliphatic anhydride such as acetic anhydride.

The imidization reaction process according to the present invention is conducted by heating a polyamic acid under reduced pressure until imidization reaction is completed.

The term "imidization reaction is completed" herein means that imidization reaction is achieved until the imidization ratio becomes not smaller than 95%, preferably not smaller than 98%, more preferably not smaller than 99%.

"The imidization ratio" herein used is a ratio determined by the following formula:

[(Number of moles of an imide group in an heating process)/ (Number of moles of an imide group when theoretical imidation is perfectly achieved)]×100

The rate is determined by the absorbance in characteristic absorption of the imide group measured by infrared radiation. More particularly, the imidation ratio herein means any one of the following:

(1) x value of the following formula determined by the absorbance between 725 $cm^{-1}$ which is one of characteristic absorption of imide and 1,025 $cm^{-1}$ which is characteristic absorption of a benzene ring:

[Absorbance of standard polyimide at (725 $cm^{-1}$/absorbance at 1,015 $cm^{-1}$)]:[absorbance of a sample in the processing process at (725 $cm^{-1}$/absorbance at 1,015 $cm^{-1}$]=100:x (2) x value of the following formula determined by the absorbance between 1,376 $cm^{-1}$ which is one of characteristic absorption of imide and 1,500 $cm^{-1}$ which is characteristic absorption of a benzene ring:

[Absorbance of standard polyimide at (1,376 $cm^{-1}$/absorbance at 1,500 $cm^{-1}$)]:[absorbance of a sample in the processing process at (1,376 $cm^{-1}$/absorbance at 1,500 $cm^{-1}$]=100:x (3) x value of the following formula determined by the absorbance between 1,780 $cm^{-1}$ which is one of characteristic absorption of imide and 1,500 $cm^{-1}$ which is characteristic absorption of a benzene ring:

[Absorbance of standard polyimide at (1,780 $cm^{-1}$/absorbance at 1,500 $cm^{-1}$)]:[absorbance of a sample in the processing process at (1,780 $cm^{-1}$/absorbance at 1,500 $cm^{-1}$]=100:x The heating condition of imidization is preferably 80° C. to 400° C. The heating temperature is preferably not lower than 100° C., more preferably not lower than 120° C. so that imidization may be carried out effectively to completely remove water and the organic solvents which reined. The maximum heating temperature is preferably set at a temperature not higher than a thermal decomposition temperature of polyimides to be formed. The temperature is usually 200° C. to 350° C. and it may be 250° C. to 350° C. to mostly complete imidization. It may remain at a predetermined temperature within the range of the above temperature or it way gradually rise within the range of the temperature.

Although the pressure is preferably as small as possible under the reduced pressure condition at the time of imidization reaction in the drying process, the pressure on the above-mentioned heating condition which enables the solvents to be effectively removed may be used. More specifically, the pressure in imidization reaction is preferably $0.9 \times 10^5$ to $0.001 \times 10^5$ Pa, more preferably $0.8 \times 10^5$ to $0.001 \times 10^5$ Pa, further preferably $0.7 \times 10^5$ to $0.01 \times 10^5$ Pa.

Any device and conditions known to the person in the art which can dry by heating under reduced pressure may be used as a specific approach to imidize a mixture of acid dianhydride and diamine under reduced pressure.

For instance, a vacuum oven can be used for a batch-type method. A still-standing mixture of acid dianhydride and diamine is heating under reduced pressure in a butch-type device such as a vacuum oven.

On the other hand, a biaxial or triaxial extruder with a decompression device may be used for a continuous method. "A biaxial or triaxial extruder with a decompression device" herein means a device which is made by adding an apparatus for removing solvent by reducing pressure to a general melting extruder for extruding thermoplastic resins by thermal melting. The mixture of acid dianhydride and diamine is heated under reduced pressure while being mixed by the biaxial or triaxial extruder to afford a polyimide by removing solvent which may exist. These approaches for imidization are properly selected in view of an output of polyimides to be targeted.

For instance, for a conventional method in the aforesaid JP63-297427, since imidization reaction does not reach completion in the processes for consuming molecular of water by chemical reaction and removing it out of the system by azeotropy and the like, a polyimide which remains in a polyamic acid is obtained as a viscous solution. Accordingly, this polyimide solution has been purified by precipitating in a poor solvent such as methanol.

On the contrary, in the present invention, a solvent with a low boiling point which is easily soluble instead of a solvent with a high boiling point can be employed. In addition, the present invention enables imidization after undergoing the generation of a polyamic acid by effectively heating at a high temperature, actively removing water remaining in the solvent and a by-product, which leads to resins having high molecular weight and high toughness without a purification process because of the completion of imidization in the first step.

Acid dianhydride and diamine may be mixed in the absence of organic solvent (i.e. without solvent) in another preferred embodiment of a method for producing a polyimide resin, even in the organic solvent. The selection of the acid dianhydride and diamine, their mixing ratio, solvent selection, and the drying process by heating under reduced pressure in this embodiment are basically similar to those in the aforementioned embodiment.

When mixing diamine and acid dianhydride in organic solvent, it is preferable that both of then are dissolved in the organic solvent. However, the reaction to polyimide formation may proceed, even if either of or both of the compounds has/have not been fully dissolved. Similarly, when acid dianhydride and diamine are mixed in the absence of organic solvent, it is preferable that they are compatible to each other, but it may be all right that they are not fully compatible.

More particularly, diamine and acid dianhydride may be reacted to afford a polyamic acid in the mixing process and there is nothing wrong with a partial reaction or no reaction at all. In the subsequent drying process by heating under reduced pressure according to the method for the present invention, it is also possible to carry out the reaction to afford a polyamic acid and imidization reaction to converse a polyamic acid to afford a polyimide.

Although in the absence of the solvent, the reaction of diamine and acid dianhydride hardly proceeds in the mixing process, the reaction to polyamic acid and imidization proceed by the dissolution of either or both of them in the subsequent drying process by heating under reduced pressure. When the mixing is performed in the absence of the solvent, the diamine compound and/or acid dianhydride compound are/is needed to have a melting point lower than the heating temperature.

The mixing may be performed by a method known to those in the art.

With the use of the method according to the present invention, it has become possible to carry out imidization reaction between acid dianhydride and diamine after the undergoing of polyamic acid formation by effectively a high temperature proceeding while actively removing the solvent and water as a by-product out of the system.

The reduced pressure conditions and heating conditions, and the devices to be used are similar to those in the above-mentioned embodiment.

The method according to the present invention enables to directly obtain targeted polyimide resins by completing the imidization reaction in the first step, heating under reduced pressure. The present invention provides a method for obtaining high molecular weight polyimide resins at high yield without a purification process which has been required in conventional methods for achieving reaction by heating and refluxing acid dianhydride and diamine in organic solvent.

Still another method for producing polyimide resins of the present invention includes a process for mixing acid dianhydride and diisocyanate to be used as material monomers, and a process for drying the reaction mixture by heating under reduced pressure after the mixing process.

In this embodiment, diisocyanate and acid dianhydride to be used as material monomer may be mixed both in organic solvent and in the absence of organic solvent (i.e. no solvents).

When acid dianhydride and diisocyanate are mixed in organic solvent, it is preferable to dissolve both of them in the solvent, but a reaction of polyimide formation may proceed even in the state that either or both of them is/are not fully dissolved. Similarly, when acid dianhydride and diisocyanate are mixed in the absence of organic solvent, it is preferable that they are mutually soluble, but the reaction of the polyimide formation may proceed even in the state that they are not fully soluble to each other.

Although the acid dianhydride to be used as a material monomer in the method of the present invention is not particularly limited, any acid dianhydrides such as the above-mentioned aromatic tetracarboxylic dianhydride or aliphatic or alicyclic tetracarboxylic acid dianhydride may be used. These acid dianhydrides may be used either alone or in combination of two or more, so that examples thereof include acid dianhydrides such as diamine and acid dianhydride used as material monomers.

Particularly, ester acid dianhydride represented by the following formula (6) is preferably used:

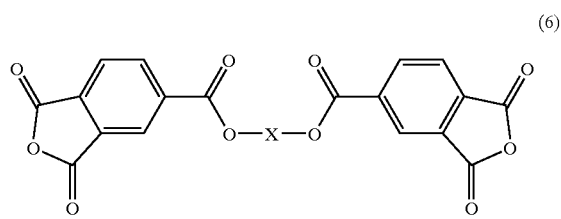

(6)

(wherein X represents a divalent organic group.)

In the above-mentioned formula (6), the divalent organic group represented by X typically has 1 to 24 carbons and an aliphatic group, an alicyclic group, an aromatic group, and a combination of these groups. X is more preferably an organic group selected from the group consisting of:

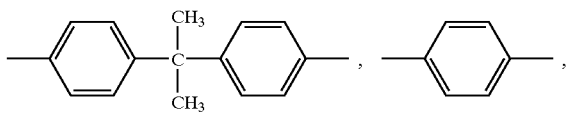

and —(CH$_2$)$_q$— (q is an integer from 1 to 10). Particularly, X is preferably an organic group selected from the group consisting of:

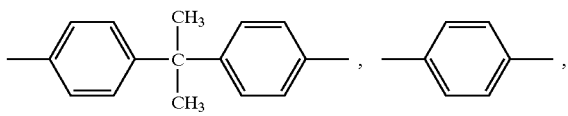

and —(CH$_2$)$_q$— (q is an integer from 1 to 10). The acid dianhydride containing ester linkage is particularly preferable because of superior solubility in organic solvent.

With the use of the acid dianhydride represented by the above-mentioned formula (6), polyimide resins which combine superior heat resistance (heat decomposition), low water absorption, and workability in addition to superior solubility in the organic solvent may be formed.

At least one kind of acid dianhydride containing ester linkage represented by the above-mentioned formula (6) is preferably used in a proportion of not smaller than 50 mole %, more preferably not smaller than 70 mole %, further preferably not smaller than 90 mole % based on the total amount of acid dianhydride. Thus, there is particularly the advantage that polyimide with low water absorption is synthesized by containing a great amount of ester acid dianhydride.

Next the diisocyanate to be used as a material monomer in the method of the present invention is not particularly limited, but examples thereof include: aromatic diisocyanate such as diphenylmethane diisocyanate, paraphenylene diisocyanate, 2,6-toluendiisocyanate, 1,5-naphthalene diisocyanate, toridineisocyanate, xylendiisocyanate, and tetramethylxylenediisocyanate. In addition to these aromatic diisocyanates, aliphatic or alicyclic diisocyanates such as hexamethylene diisocyanate, isofolon diisocyanate, lyginegiisocyanate may be used in combination. The definition of "aromatic", "aliphatic", and "alicyclic" is similar to that of acid dianhydride. These diisocyanates may be used either alone or in combination of two or more.

The preferred embodiment of diisocyanate to be used in the method of the present invention is represented by the following formula (7):

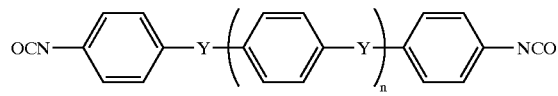

(7)

(wherein Y represents a divalent organic group and n is an integer from 0 to 10).

In the compound represented by the above-mentioned formula (7), Y is preferably independent, a single bond, —C(CH$_3$)$_2$—, (CH$_2$)$_m$— (m is an integer from 1 to 10), —C(CF$_3$)$_2$—, —O—, —S—, —C(=O)—, —C(=O)O—, or —NHCO—, more preferably —C(CH$_3$)$_2$— and —(CH$_2$)$_m$— (m is an integer from 1 to 6), or —C(CF$_3$)$_2$—. Particularly, Y is preferably a hydrocarbon group in view of solubility in organic solvent.

Polyimide resins combining superior heat resistance (heat decomposition resistance), low water absorption, and workability in addition to solubility in organic solvents may be formed by the use of diisocyanate as indicated by the above-mentioned formula (7). At least one kind of diisocyanate represented by the above-mentioned formula (7) is used in a proportion of not smaller than 50 mole %, preferably not smaller than 70 mole %, more preferably not smaller than 90 mole % based on the total amount of diisocyanate.

It is preferable that the ratio between diisocyanate and acid dianhydride, is substantially equimolar.

With the use of the above-mentioned acid dianhydride and diisocyanate, polyimide resins combining superior heat resistance (heat decomposition resistance), low water absorption, workability and solubility in organic solvent may be obtained.

The process for mixing acid dianhydride and diisocyanate may be carried out while dissolving the diisocyanate and acid dianhydride in organic solvent. The process may also be achieved in the absence of the organic solvent. When acid dianhydride and isocyanate are dissolved in organic solvent, they are both preferably dissolved in the organic solvent, but the reaction of polyimide formation may proceed even in the state that either or both of them is/are not fully dissolved.

Similarly, when the acid dianhydride and diisocyanate are mixed in the absence of organic solvent, it is preferable that they are compatible, but the reaction of polyimide formation may proceed even in the state that they are not fully compatible each other.

In this case, the acid dianhydride and diisocyanate may be either solid or liquid. Men they are solid, they may be melted by heating.

The organic solvent to be used in the above-mentioned mixing process is typically organic polar solvent. The organic polar solvent to be used is not particularly limited, but its examples may include similar solvents to the above-mentioned organic solvents. The solvents are not particularly limited, but it is advantageous in the process to select the one having a boiling point as lower as possible.

According to the method of the present invention, the removal of the solvents and imidization are conducted simultaneously when imidization is conducted by mixing acid dianhydride and diisocyanate in the drying process by heating the reaction mixture generated by the mixture of the acid dianhydride and diisocyanate under reduced pressure. For the specific procedure of drying by heating the mixture of acid dianhydride and diisocyanate under reduced pressure, any devices and conditions which may be dried by heating known to those skilled in the art are used, so that it is similar to that in the method for obtaining polyimide resins from the above-mentioned acid dianhydride and diamine.

Heating conditions and reduced pressure conditions in the drying process are similar to those described in the method for obtaining polyimide resins from the above-mentioned acid dianhydride and diamine.

In a conventional method to obtain a polyimide resin by heating to react diisocyanate and acid dianhydride in solvent with a high boiling point, polyimide resins were sometimes not obtained until the purification process was finished by precipitating the obtained polyimide solvent in a poor solvent such as methanol because of insufficient development of imidization reaction.

The present invention, however, does not need such a purification process. In addition, imidization can be achieved by effective high-temperature treatment while actively draining the solvent out of the system by heating and reducing pressure. In the method of the present invention, polyimide resins in which imidization has highly been completed without undergoing the purification process of the targeted polyimide resins can be obtained at high yield by heating the imidization reaction between acid dianhydride and diisocyanate under reduced pressure to complete imidization in one step. This enables to obtain high molecular weight and highly tough polyimide resins.

According to the methods described in a variety of embodiments as mentioned above, high molecular weight polyimide resins can be produced at high yield. "Resins" herein mean that a high polymer substance with sufficient strength and workability as a molding material. The polyimide resin formed by the method according to the present invention preferably has an weight-average molecular weight of 5,000 to 1,000,000, more preferably has 5,000 to 200,000. If the weight-average molecular weight is smaller than 5,000, the resulting polyimide resin will be brittle, which leads to an undesirable tendency. Conversely, if the weight-average molecular weight is greater than 1,000,000, the resulting polyimide resin will have poor workability, which leads to an undesirable tendency.

The polyimide resins formed by the method according to the present invention are preferably soluble in organic solvents. "Soluble in organic solvent" herein means the degree of solubility in predetermined organic solvent, N,N-dimethylformamide at least 5 wt %, preferably not smaller than 10 wt %. The polyimide soluble in organic solvent is suitable for smooth imidization until the completion of reaction because of no fear of phase separation of the components halfway through the reaction in imidization reaction for heating under reduced pressure in the presence of the organic solvent.

Basically, it is preferable that the mixture ratio of diamine and acid dianhydride which are material monomers for the polyimide resin of the present invention is substantially equimolar, but the diamine may be added more than the acid dianhydride to control over a terminal in other preferred embodiment. If diamine is used in amount not smaller than the amount of acid dianhydride, the polyimide resin to be used as an end-product will be able to have an amino group in a major of end portions of moleculars instead of a carboxyl group. Thus, the control of a polyimide resin terminal according to the amount of diamine reacts an amino-terminated polyimide molecular with an epoxy resin having reactivity to the amino group to generate crosslinking reaction between the polyimide molecule and the epoxy group. As a result, characteristics of polyimide can be added to further improve physical properties of the epoxy resin such as heat resistance. In this case, the mole ratio between the diamine (or amine) component and acid dianhydride component may be preferably within the range of 100:100 to 100:50, more preferably 100:100 to 100:70, furthermore preferably 100:100 to 100:90.

When the material monomers are diisocyanate and acid anhydride, diisocyanate may similarly be added more than acid dianhydride. If diisocyanate is used in amount not smaller than the amount of acid dianhydride, the polyimide resin which is an end-product will be able to have an isocyanate group in the major portions of the molecular ends instead of a carboxyl group. Accordingly, the control of the polyimide resin terminal according to the amount of diisocyanate reacts a terminated-isocyanate type polyimide molecular with an epoxy resin having reactivity to the isocyanate group to generate crosslinking reaction between the polyimide molecule and the epoxy group. As a result, characteristics of polyimide can be added to further improve physical properties of the epoxy resin such as heat resistance.

The mole ratio with the material component may be preferably within the range of 100:100 to 100:50, more preferably 100:100 to 100:70, furthermore preferably 100:100 to 100:90.

A variety of changes, modifications, variations such as the combination of various kinds of organic additives or inorganic filler groups or various kinds of impact strength modifiers to this polyimide composition may be added.

EXAMPLES

The present invention will hereafter be described more particularly by showing examples thereof, but the present invention is not limited to these examples.

ESDA used in examples expresses 2,2-bis(4-hydroxyphenyl)propanedibenzoate-3,3',4,4'-tetracarboxylic acid dianhydride, 6FDA expresses 2,2'-hexafluoropropy-propylidenediphthalic acid dianhydride, BAPS-M expresses bis[4-(3-aminophenoxyphenyl)sulfone, expresses N,N-dimethylacetamide, and DMF expresses N,N-Dimethylformamide.

Measurement of Glass Transition Temperature

A glass transition temperature (Tg) was lured within the temperature range from the room temperature to 400° C. at the rate of rise in temperature of 10° C./minute under a nitrogen atmosphere using a DSC CELL SCC-41 (a differential scanning calorimeter produced by Shimadzu Corporation).

Measurement of Weight-average Molecular Weight

The weight-average molecular weight (Mw) was measured with a GPC produced by Waters Corporation under the following conditions:

| Column: 2 pieces of KD-806M (produced by Shodex) | |
| --- | --- |
| Temperature: | 60° C. |
| Detector: | RI (Refractive Index) |
| Flow rate: | 1 ml/minute |
| Developer: | Dimethylformamide (DMF: lithium bromide 0.03M, phosphoric acid 0.03M) |
| Concentration of sample solution: | 0.2 wt % |
| Injection amount: | 20 µl |
| Reference material: | polyethylene oxide |

Measurement of Imidization Ratio

A standard sample was prepared as follows to determine the imidization ratio of the obtained resin by comparing the sample:

(1) Preparation of Standard Sample

A polyamic acid solution (DMF solution) prepared by the mixture of materials similar to the composition of examples or comparative examples is cast on a poly(ethylene terephthalate) film (PET film), peeled off from the PET film after drying by heating at 100° C. for 10 minutes and 130° C. for 10 minutes under atmospheric pressure, and fixed to a pin frame. The DMF solution was further heated at 150° C. for 60 minutes, 200° C. for 60 minutes, and 250° C. for 60 minutes in order to obtain a polyimide film with a thickness of 5 µm by the completion of imidization. This film is used as standard polyimide.

(2) Polyimide prepared in the examples or the comparative examples is dissolved in DMF and cast on a PET film, peeled off from the PET film after drying by heating at 100° C. for 30 minutes under atmospheric pressure. The polyimide is dried by heating at 70° C. for 12 hours under the pressure of 0.1 in a vacuum oven to obtain a polyimide film with a thickness of 5 µm. Infrared radiation (IR) of respective films is measured to determine the absorbance ((imide around 1,780 cm$^{-1}$)/(benzene ring around 1,500 cm$^{-1}$)). Imidization ratio is obtained by determining the percentage of the absorbance in (2)(imide/benzene ring) when the absorbance (imide/benzene ring) obtained in (1) is 100% imidization ratio. A FT-IR SYSTEM2000 (produced by Parkingelmer) was used to measure the infrared radiation.

Solubility Performance Evaluation

Evaluation of solubility performance was conducted using N,N-dimethylformamide as an organic solvent. 5 g of polyimide was added to the 95 g-solvent and visual observation was made to check whether the polyimide had been completely dissolved after fully stirring at 20° C.

Example 1

107.6 g (0.25 mole) of BAPS-M and 600 g of DMF were placed in a 2,000 ml-separable flask equipped with a stirrer to be vigorously stirred and the stirring was continued for 30 minutes to obtain a polyamic acid solution. The weight-average molecular weight (hereinafter referred to as Mw) of this polyamic acid was 100,000.

300 g of this polyamic acid solution was placed in a butt coated by Teflon and successively heated with a vacuum oven at 150° C. for 10 minutes, 160° C. for 10 minutes, 170° C. for 10 minutes, 180° C. for 10 minutes, 190° C. for 10 minutes, and 210° C. for 30 minutes under reduced pressure while maintaining the pressure of 5 mmHg (about 0.007×10$^5$ Pa).

The polyimide was taken out of the vacuum oven and 85.4 g of thermoplastic polyimide was obtained. The Mw of the polyimide was 100,000, the Tg was 190° C., and the imidization ratio was 100%.

Comparative Example 1

250 g of the polyamic acid used in the Example 1, 9.3 g (0.2 mole) of β-picoline, 50 g of acetic anhydride, and 100 g of DMAc were placed in a reactor to be stirred at room temperature for an hour and then heated to the temperature of about 100° C. The stirring was further conducted for an hour to be imidized. Such reaction was performed under a nitrogen air current.

After the completion of the reaction, the reacted solution was poured into methanol for purification, and separated by filtration. The obtained solid was purified with a Soxhlet extractor (methanol solvent) for 6 hours and dried to obtain 70 g of polyimide as white powder. The Mw of the polyimide powder was 70,000, the Tg was 190° C., and imidization ratio was 98%.

Comparative Example 2

250 g of polyamic acid used in Example 1, 50 g of toluene, and 9.3 g of β-picoline were placed in a 2,000 ml-separable flask equipped with a stirrer and a Dean Stark reflux condenser tube to be stirred by heating at 170° C. Stirring by heating was performed until the generation of water stopped. Such reaction was performed under a nitrogen air current. After the completion of the reaction, the reacted solution was poured into methanol, and separated by filtration. The obtained solid was purified with a Soxhlet extractor (methanol solvent) for 6 hours and dried to obtain 69 g of polyimide as white powder. The Mw of the polyimide powder was 30,000, the Tg was 175° C., and imidization ratio was 95%.

Example 2

57.65 Kg of BAPS-M (100 mole) and 235 Kg of DMF were placed in a 500 Kg-scale of reactor equipped with a stirrer and 43.05 Kg (100 mole) of ESDA was added while vigorously stirring. The stirring was continued for 60 minutes to obtain a polyamic acid solution. The Mw of the polyamic acid was 120,000.

The polyamic acid was directly imidized while being heated under reduced pressure using the following evaporation separator. The recovered imide composition out of the used 150-Kg amic acid solution was 42 Kg and the yield from the starting material was 96.8%. The Mw of the obtained polyimide was 120,000, the Tg was 190° C., the imidization ratio was 100%.

| | |
|---|---|
| Evaporation separator: | Homostrophic biaxis extruder with an inner diameter of 40 mm (BT-40-S2-48-L model) produced by Plastic Engineering Research Center |
| Heating section: | About 2m divided into 4 blocks and heating temperature can be set. |
| Decompression section: | 4 portions of holes equipped with the portions to be heated wherein the pressure can be reduced while heating and mixing. |
| Operation conditions: | Rate of feeding a solution (amic acid solution) at 10 Kg/hour. Heating temperature: 4 blocks are respectively set at 180° C., 230° C., 280° C., and 280° C. Reduced pressure: 0.1 × 10$^5$ Pa Rotational speed of biaxial extruder: 100 rpm |

Example 3

An experiment was performed using the polyimide acid used in Example 2. The polyamic acid was directly imidized while being heated under reduced pressure using the following evaporation separator. The recovered imide composition out of the used 150 Kg-amic acid solution was 41.0 Kgs and the yield from the starting material was 94.5%. The Mw of the obtained polyimide was 120,000, the Tg was 190° C., the imidization ratio was 100%.

The evaporation separator SC Processor produced by Kurimoto, Ltd. (a paddle whose biaxes rotate in different directions has a large heating area because of being a hollow type and internal circulation of a heating medium, a vaporizing chamber on the upper part which provides large evaporation capacity. This device is cylindrical, and has an inlet on the side of one end and an outlet on the side of another end. The length between the inlet and outlet is referred to as the length of a cylinder.)

| | |
|---|---|
| Model No.: | SCP-100 (Vacuum specification = Wilson seal is used in the shaft sealing portion) |
| Size: | Inner diameter 100 mm × length of the cylinder 900 mm |
| Heating temperature: | 280° C. |
| Degree of vacuum: | 0.1 atm |
| Rotational speed of biaxial extruder: | 30 rpm |

Example 4

500 g of polyamic acid solution used in Example 2 was poured in a reactor with a stirrer and 1 g of water was added to be stirred at 40° C. for 2 hours. The Mw of the polyamic acid after the completion of stirring was 4,500.

This 500 g-polyamic acid was imidized using a vacuum oven in the same manner in Example 1. The polyimide was taken out from the vacuum oven and 145 g of thermolplastic polyimide was obtained. The Mw of this polyimide was 90,000, the Tg was 190° C., the imidization ratio was 100%

Example 5

109.9 g (0.3 mole) of 2,2-bis(3-amino-4-hydroxyphenyl) hexafluoropane, 567.5 g of DMAc, and 133.3 g (0.3 mole) of 6FDA were placed in a 2,000 ml-separable flask equipped with a stirrer to be vigorously stirred and the stirring was continued for 30 minutes to obtain a polyamic acid solution. The Mw of this polyamic acid was 150,000.

400 g of this polyamic acid solution was placed in a Teflon-coated butt for imidization using a vacuum oven in the same manner as in Example 1. The polyimide was taken out of the vacuum oven and 112 g of thermoplastic polyimide was obtained. The Mw of this polyimide was 149,000, the Tg was 145° C. and the imidization ratio was 100%.

Comparative Example 3

400 g of polyamic acid used in Example 5, 50 g of toluene, and 13 g of β-picoline were placed in a 2,000 ml-separable flask equipped with a stirrer and a Dean Stark reflux condenser tube to be stirred by heating at 170° C. Stirring by heating was performed until the generation of water stopped (about 4 hours). Such reaction was performed under a nitrogen air current. After the completion of the reaction, the reacted solution was poured into methanol, and separated by filtration. The obtained solid was purified with a Soxhlet extractor (methanol solvent) for 6 hours and dried to obtain 69 g of polyimide as white powder. The MW of this polyimide powder was 33,000, the Tg was 135° C., and the imidization ratio was 95%. If the polyimide has a configuration having a hydroxyl group on its side chain in the same manner as in Example 5, imidization will not normally proceed because of the reaction with acetic anhydride and the hydroxyl group located on the side chain or a carboxy group. This makes it impossible to carry out chemical imidization using acetic anhydride as a dehydrating agent.

Example 6

86.1 g (0.2 mole) of BAPS-M and 555 g of DMAc were placed in a 2,000 ml-separable flask equipped with a stirrer and 144.1 g of ESDA (0.25 mole) was added while vigorously stirring. The stirring was continued for 30 minutes and then 7.6 g (0.05 mole) of 3,5-diaminobenzoic acid was added. The stirring was continued for 30 minutes to obtain a polyamic acid solution. The Mw of the polyamic acid was 150,000.

400 g of this polyamic acid solution was poured into a Teflon-coated butt for imidization using a vacuum oven in the same manner as in Example 1. The polyimide was taken out of the vacuum oven and 115 g of thermoplastic polyimide was obtained. The Ma of this polyimide was 149,000, the Tg was 165° C., and the imidization ratio was 100%.

Comparative Example 4

250 g of polyamic acid used in Example 6, 50 g of toluene, and 9.3 g of β-picoline were placed in a 2,000 ml-separable flask equipped with a stirrer and a Dean Stark reflux condenser tube to be stirred by heating at 170° C. Stirring by heating was performed until the generation of water stopped (about 4 hours). Such reaction was performed under a nitrogen air current. After the completion of the reaction, the reacted solution was poured into methanol, and separate by filtration. The obtained solid was purified with a Soxhlet extractor (methanol solvent) for 6 hours and dried to obtain 70 g of polyimide as white powder. The Mw of the polyimide powder was 28,000, the Tg was 155° C., and imidization ratio was 94%. If the polyimide has a configuration having a hydroxyl group on its side chain similar to Example 6, it will be impossible to carry out chemical imidization because of the reaction between acetic anhydride and carboxylic acid.

Example 7

107.6 g (0.25 mole) of BAPS-M and 600 g of DMF were placed in a 2,000 ml-separable flask and 144.1 g (0.25 mole) of ESDA was added while stirring. After the addition, the stirring was continued until complete dissolution of ESDA had been visually observed.

300 g of this mixed solution was poured into a Teflon-coated butt to be heated at 210° C. for 30 minutes at a reduced pressure of 5 mmHg (about $0.007 \times 10^5$ Pa).

The polyimide was taken out of the vacuum oven and 85.4 g of thermoplastic polyimide was obtained. The Mw of this polyimide was 47,000, the Tg was 190° C., and the imidization ratio was 100%. The polyimide showed solubility in DMF.

In this example, heating under reduced pressure was performed in the mixing process before polyamic acid was generated and polymerization and imidization simultaneously proceed in the drying precess.

Comparative Example 5

The mixed solution obtained in the same manner as in Example 7 was stirred for 30 minutes to obtain a polyamic acid solution. 9.3 g (0.2 mole) of β-picoline, 50 g (0.49 mole) of acetic anhydride were added to this 250 g-polyamic acid solution, and 100 g of DMF were further added to be stirred at room temperature for 30 minutes and then heated to the temperature of about 100° C. The stirring was further conducted for 1 hour for imidization. Such reaction was performed under a nitrogen air After the completion of the reaction, this solution was added dropwise to methanol with vigorous stirring for purification. Filamentous polyimide precipitated in the methanol was pulverized with a mixer and Soxhlet cleansing was performed with methanol. After drying for 2 hours at 110° C., a 70 g-polyimide powder was obtained. The Mw of this polyimide was 40,000, the Tg was 190° C., and the imidization ratio was 98%.

Comparative Example 6

The mixed solution obtained in the same manner as in Example 7 was stirred for 30 minutes to obtain a polyamic acid solution. 250 g of this polyamic acid, 50 g of toluene, and 9.3 g of β-picoline were placed in a 2,000 ml-separable flask equipped with a stirrer and a Dean Stark reflux condenser tube to be stirred by heating at 170° C. Stirring by heating was performed until the generation of water stopped (about 4 hours). Such reaction was performed under a nitrogen air current.

After the reaction, this solution was added dropwise to methanol with vigorous stirring for purification. Filamentous polyimide precipitated in the methanol was pulverized with a mixer and Soxhlet cleansing was performed with methanol. After drying for 2 hours at 110° C., a 70 g-polyimide powder was obtained. The M of this polyimide was 30,000, the Tg was 180° C., and the imidization ratio was 95%.

Example 8

59.6 g (0.25 mole) of 4,4'-methylenebis(2-methylcyclohexylamine) and 465 g of DMF were placed in a 2,000 ml-separable flask and 144.1 g (0.25 mole) of ESDA was added while stirring. Upon the addition, colorless solid salt was precipitated.

100 g of this salt was placed in a Teflon-coated butt and heated at 210° C. for 30 minutes at a reduced pressure of 5 mmHg (about $0.007 \times 10^5$ Pa).

The polyimide was taken out of the vaccum oven and 70.5 g of thermoplastic polyimide was obtained. The Mw of this polyimide was 50,000, the Tg was 160° C., and the imidization ratio was 100%. The polyimide showed solubility in DMF.

Comparative Example 7

After the pulverization of 80 g of the salt obtained in the same manner as in Example 2, 9.3 g (0.20 mole) of β-picoline, 50 g (0.49 mole) of acetic anhydride, and 300 g of DMF were added to be stirred. The salt was not soluble in DMF, remaining precipitated, so that the reaction did not proceed.

Example 9

86.1 g (0.20 mole) of BAPS-M and 400 g of DMF were placed in a 2,000 ml-separable flask and 144.1 g (0.25 mole) of ESDA was added while stirring. Subsequently, a mixed solution of 65 g (0.05 mole) of α,ω-bis(3-aminopropyl)polydimethyl siloxane and 200 g of DMF was added while stirring.

300 g of this mixed solution was poured into a butt coated with Teflon and heated at 210° C. for 30 minutes at a reduced pressure of 5 mmHg (about 0.007 atmospheric pressure).

The polyimide was taken out of the vacuum oven and 91.0 g of thermoplastic polyimide was obtained. The Mw of this polyimide was 90,000, the Tg was 180° C., and the imidization ratio was 100%. The polyimide showed solubility in DMF.

Example 10

86.1 g (0.20 mole) of BAPS-M and 555 g of DMF were placed in a 2,000 ml-separable flask and 144.1 g (0.25 mole) of ESDA was added while stirring. Subsequently, 7.6 g (0.05 mole) of 3,5-diaminobenzoic acid was added.

300 g of this mixed solution was poured into a Teflon-coated butt and heated at 210° C. for 30 minutes at a reduced pressure of 5 mmHg (about 0.007 atmospheric pressure).

The polyimide was taken out of the vacuum oven and 91.0 g of thermoplastic polyimide was obtained. The Mw of this polyimide was 50,000, the Tg was 165° C., and the imidization ratio was 100%. The polyimide showed solubility in DMF.

If the polyimide has a configuration having a hydroxyl group on a side chain like Example 10, it will be impossible to carry out chemical imidization because of the reaction between acetic anhydride and carboxylic acid.

Example 11

280 g of DMF, 0.1487 mole of diphenylmethanediisoyanate, and 0.1487 mole of ESDA were placed in a 500 ml-glass flask to be stirred at roan temperature for 30 minutes.

300 g of this mixed solution was poured into a Teflon-coated butt and heated at 210° C. for 2 hours at a reduced pressure of 5 mmHg (about $0.007 \times 10^5$ Pa).

The polyimide was taken out of the vacuum oven and 85.4 g of thermoplastic polyimide was obtained. The Mw of this polyimide was 50,000, the Tg was 200° C., and the polyimide showed solubility in DMF. The water absorption was 0.8%.

Comparative Example 8

250 g of the mixed solution used in Example 11 was taken to be stirred by heating at 130° C. for 3 hours for imidization. Such reaction was carried out under a nitrogen air current. After the completion of the reaction, the reacted solution was poured into methanol, and separated by filtration. The obtained solid was purified with a Soxhlet extractor (methanol solvent) for 6 hours and dried to obtain 70 g of polyimide as white powder. The Mw of this polyimide powder was 4,000, the Tg was 170° C.

Example 12

280 g of DMF, 0.1487 mole of diphenylethanediisocyanate, and 0.1487 mole of ESDA were placed in a 500 ml-glass flask to be stirred at roan temperature for 30 minutes. 300 g of this mixed solution was poured into a Teflon-coated butt and heated at 210° C. for 2 hours at a reduced pressure of 5 mmHg (about $0.007 \times 10^5$ Pa).

The polyimide was taken out of the vacuum oven and 85.4 g of thermoplastic polyimide was obtained. The Mw of this polyimide was 50,000, the Tg was 190° C., and the polyimide showed solubility in DMF.

Example 13

The mixed solution obtained in Example 11 was imidized by heating and reducing pressure using the evaporation separator used in Example 2 under the following operation conditions. The produced imide composition out of the used 150 Kg-amic acid solution was 43.0 Kg and the yield from the starting material was 97.3%. The Mw of the obtained polyimide was 60,000, the Tg was 200° C., and was soluble in DMF.

| Operation conditions: | Rate of feeding a solution (amic acid solution) at 10 Kg/hour. Heating temperature: 280° C. (each block) Reduced pressure: 0.1 atmospheric pressure Rotational speed of biaxial extruder: 100 rpm |
|---|---|

Example 14

An experiment was performed using the mixed solution of the diisocyanate and the acid dianhydride used in Example 11. The mixed solution was imidized while heating under reduced pressure using the evaporation separator used in Example 13 under the similar operation conditions. The produced imide composition out of the used 150 Kg-amic acid solution was 42.0 Kg and the yield from the starting material was 95.0%. The Mw of the obtained polyimide was 60,000, and the Tg was 200° C.

Comparative Example 9

280 g of dimethylforamide (DMF), 0.1487 mole of diphenylmethanediisocyanate, and 0.1487 mole of benzophenonetetracarboxylic acid dianhydride (hereinafter referred to as BTDA) were placed in a 500 ml-glass flask to be stirred at room temperature for 30 minutes.

300 g of this mixed solution was poured into a Teflon-coated butt and heated at 210° C. for 2 hours at a reduced pressure of 5 mmHg.

The polyimide was taken out of the vacuum oven and 85.4 g of polyimide was obtained. The Mw of this polyimide was 50,000, the Tg was 250° C., and was insoluble in DMF. The water absorption was 1.8%.

Industrial Applicability

The present invention can provide method for easily producing high-molecular weight polyimide resins at high yield by drying and heating a mixture mixed by material monomers for polyimides.

What is claimed is:

1. A method for producing a polyimide resin comprising the processes of:
    (a) mixing material monomers for polyimides to form a mixture thereof; and
    (b) drying the resulting mixture in the absence of both an azeotropic solvent and a dehydrating condensation agent by heating it under reduced pressure until its imidization reaction is completed.

2. A method for producing a polyimide resin comprising the processes of:
    (a) producing a polyamic acid by mixing an acid dianhydride and a diamine in an organic solvent and reacting between them; and
    (b) drying the resulting polyamic acid in the absence of an azeotropic solvent and a dehydrating condensation agent by heating it under reduced pressure until its imidization reaction is completed.

3. The method according to claim 1, wherein a salt is produced in said mixing process (a).

4. The method according to claim 1, wherein the material monomers for polyimides are an acid dianhydride and a diisocyanate in said process (a).

5. The method according to claim 4, wherein said mixture contains an organic solvent.

6. The method according to any one of claims 1, 2, 3 or 4, wherein the ambient temperature is adjusted within the range of 80° C. to 400° C., and/or the pressure is within the range of $0.001 \times 10^5$ Pa to $0.9 \times 10^5$ Pa in said drying process.

7. The method according to claim 6, wherein the pressure is adjusted within the range of $0.001 \times 10^5$ Pa to $0.6 \times 10^5$ Pa.

8. The method according to any one of claims 1, 2, 3 or 4, wherein said polyimide resin has a glass transition temperature of 350° C. or lower and/or a weight-average molecular weight of 5,000 to 1,000,000.

9. The method according to claim 2, wherein the weight-average molecular weight of the polyimide formed in said drying process is substantially identical with the theoretical molecular weight of the polyimide obtained from the weigh-average molecular weight of the polyamic acid, or the weight-average molecular weight of the polyimide increases.

10. The method according to any one of claims 1, 2, 3 or 4, wherein said polyimide resin is soluble in an organic solvent.

11. The method according to any one of claims 2, 3 or 4, wherein said acid dianhydride includes one kind or a combination of at least two kinds of acid dianhydride selected from the following formulae (1) to (3) in a proportion of not smaller than 10 mole %:

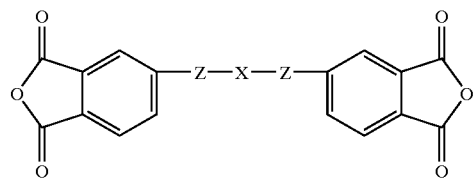

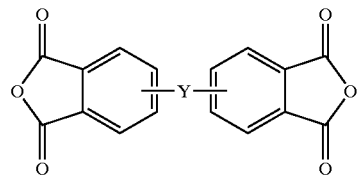

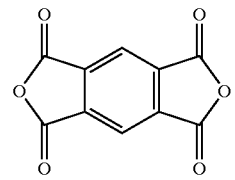

(wherein X is a divalent organic group, and Y and Z are each a single bond or a divalent organic group).

12. The method according to claim 11, wherein X in said formula (1) represents —C(CH$_3$)$_2$—, —(CF$_3$)$_2$—, —CH$_2$C(CH$_3$)$_2$CH$_2$—, —(CH$_2$)$_q$— (q is an integer from 1 to 10) and

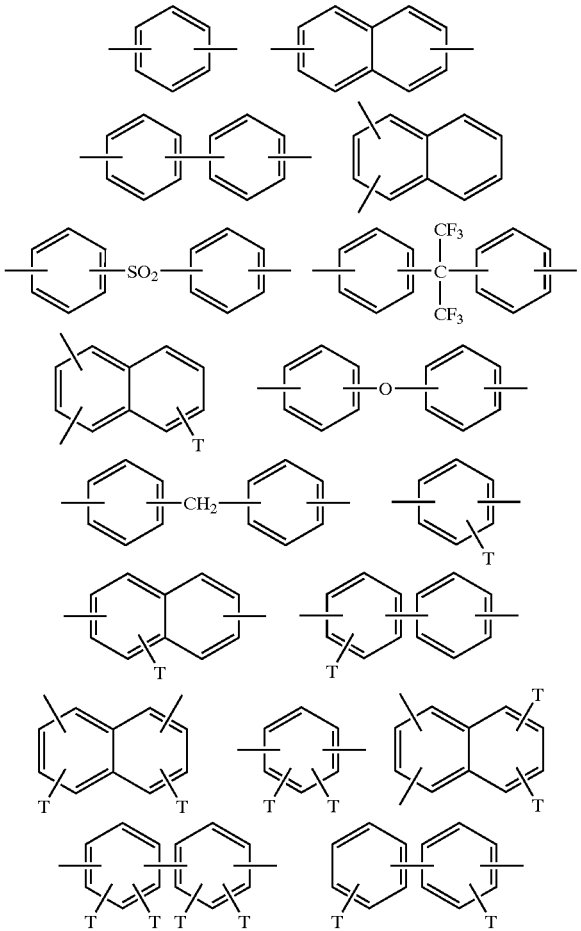

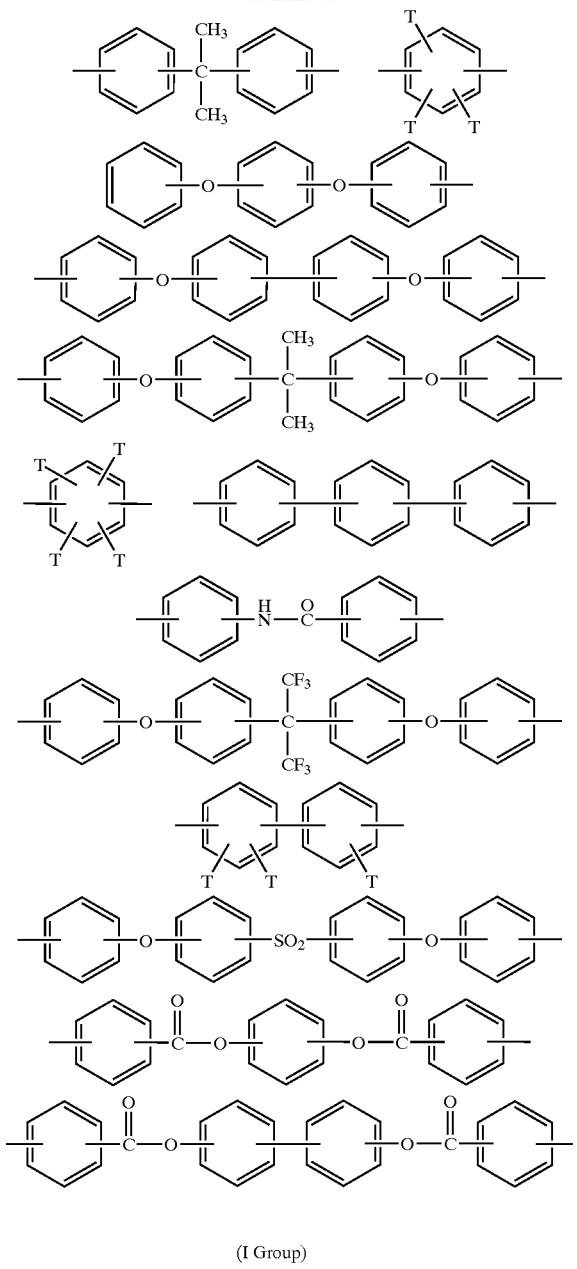

(I Group)

is a divalent organic group selected from I group (wherein T is any one of Cl, F, Br, CH$_3$—, CH$_3$O—).

13. The method according to claim 11, wherein Z in said formula (1) is a divalent organic group selected a single bond, —O—, —C(=O)—, —C(=O)O—, and —SO$_2$—.

14. The method according to claim 11, wherein Y in said formula (2) is a divalent organic group selected from the group consisting of a single bond, —O—, —C(=O)—, or —SO$_2$—.

15. The method according to claims 2 or 3, wherein said diamine is an aliphatic diamine and/or an alicyclic diamine.

16. The method according to claim 15, wherein said diamine contains at least one kind of diamine represented by the following formulae (4) and (5) in a proportion of not smaller than 10 mole % based on the total amount of diamine monomer:

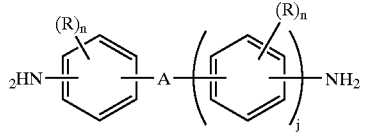

(4)

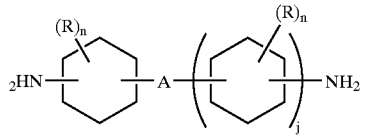

(5)

(wherein R is independently selected from the group consisting of Cl, F, Br, a hydroxy group, a carboxy group, or an alkyl group having 1 to 4 carbons, and an alkoxyl group, and A is an independent divalent organic group selected from a single bond, —C(CH$_3$)$_2$—, —(CH$_2$)$_p$— (p is an integer not smaller than 1), —C(CF$_3$)$_2$—, —O—, —S—, SO$_2$—, —C(=O)—, —C(=O)O—, or —NHCO—, n=0, 1, and 2, j is an integer not smaller than 0).

17. The method according to claim 16, wherein said diamine contains one kind or a combination of at least two kinds of diamines selected from the following formulae in a proportion of not smaller than 10 mole % based on the total amount of diamine monomers:

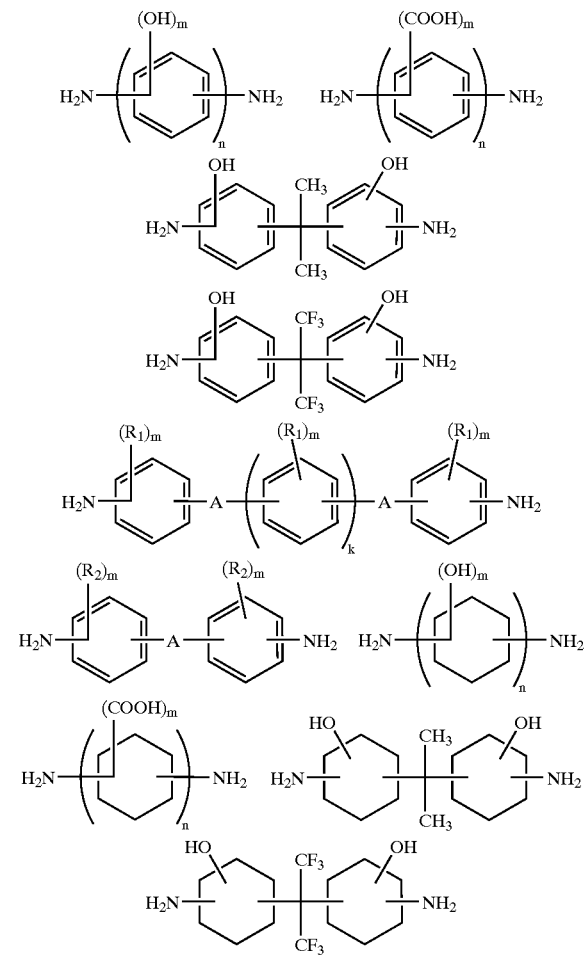

-continued

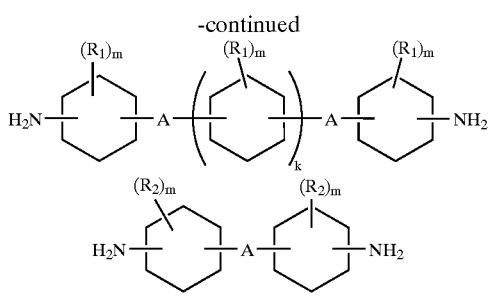

(wherein $R_1$ is Cl, F, Br or $CH_3$— or $CH_3O$—, $R_2$ is hydrogen, an alkyl group having 1 to 4 carbons or an alkoxyl group having 1 to 4 carbons, A is a divalent organic group selected from a single bond, —$C(CH_3)_2$—, —S—, —O—, —SO—, —$SO_2$—, —C(=O)—, —$(CH_2)_p$— (p is an integer from 1 to 10), —$C(CF_3)_2$—, —C(=O)O—, and —NHCO—, m=0, 1, and 2, n=1, 2, k is an integer of not smaller than 0).

18. The method according to claim 4, wherein said acid dianhydride contains an ester acid dianhydride of the following formula (6) in a proportion of not smaller than 50 mole % based on the total amount of acid dianhydride monomer:

(6)

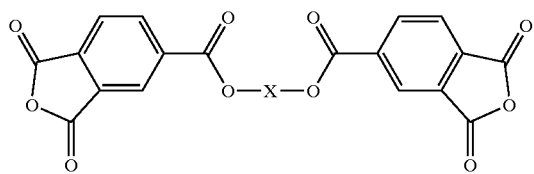

(wherein X represents a divalent organic group.).

19. The method according to claim 18, wherein X is said formula (6) is selected from the group consisting of

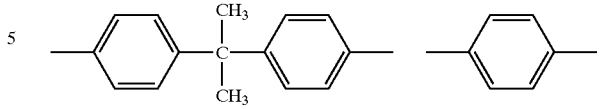

—$CH_2$ or $(CH_2)_q$— (q is an integer of not smaller than 1).

20. The method according to claim 4, wherein said diisocyanate contains at least one kind of diisocyanate in a proportion of not smaller than 50 mole % represented by the following formula (7):

(7)

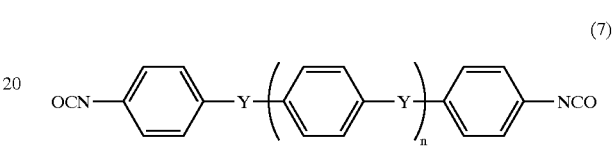

(wherein Y is a divalent organic group and n is an integer from 1 to 10).

21. The method according to claim 20, wherein Y in said formula (7) is a divalent organic group selected from the group consisting of a single bond, —$C(CH_3)_2$—, —$(CH_2)_m$— (m is an integer of not smaller than 1), —$C(CF_3)_2$—, —S—, —O—, —C(=O)—, —$SO_2$—, —C(=O)O—, or —NHCO—.

* * * * *